United States Patent [19]
Robinson

[11] Patent Number: 5,749,625
[45] Date of Patent: May 12, 1998

[54] SEAT RECLINER FOR REDUCING CHUCKING

[75] Inventor: David L. Robinson, Sterling Heights, Mich.

[73] Assignee: Fisher Dynamics Corporation, St. Clair Shores, Mich.

[21] Appl. No.: 799,216

[22] Filed: Feb. 14, 1997

Related U.S. Application Data

[63] Continuation of Ser. No. 623,465, Mar. 28, 1996, Pat. No. 5,622,410.

[51] Int. Cl.$^6$ ............................................. B60N 2/02
[52] U.S. Cl. ........................................ 297/367; 297/354.12
[58] Field of Search ............................... 297/366, 367, 297/354.1, 354.12, 368, 369

[56] References Cited

U.S. PATENT DOCUMENTS

| | | |
|---|---|---|
| Re. 32,884 | 3/1989 | Kluting et al. |
| 3,999,247 | 12/1976 | Cremer |
| 4,165,128 | 8/1979 | Strowick et al. |
| 4,223,947 | 9/1980 | Cremer |
| 4,227,741 | 10/1980 | Gross et al. |
| 4,295,682 | 10/1981 | Kluting et al. |
| 4,314,729 | 2/1982 | Klueting |
| 4,357,050 | 11/1982 | Fisher, III |
| 4,406,497 | 9/1983 | Kluting |
| 4,591,207 | 5/1986 | Nithammer et al. |
| 4,615,551 | 10/1986 | Kinaga et al. |
| 4,687,252 | 8/1987 | Bell et al. |
| 4,705,319 | 11/1987 | Bell |
| 4,709,965 | 12/1987 | Kazaoka et al. |
| 4,765,681 | 8/1988 | Houghtaling et al. |
| 4,770,463 | 9/1988 | Nishino |
| 4,795,213 | 1/1989 | Bell |
| 4,801,177 | 1/1989 | Kanazawa |
| 4,913,494 | 4/1990 | Ikegaya |
| 5,150,632 | 9/1992 | Hein |
| 5,156,439 | 10/1992 | Idlani et al. |
| 5,205,609 | 4/1993 | Notta et al. |

FOREIGN PATENT DOCUMENTS 2041092  8/1992  Canada.

OTHER PUBLICATIONS

Official Gazaeet, Oct. 14, 1980, p. 598. U.S. Pat. No. 4,227,741 Titled: Backlash Free Seat Adjuster, Inventors: Josef Gross, Rockenhausen; Heinz Werner, Remscheid-Hasten; Volker Schmidt, Rockenhausen, and Heinz P. Cremer, Remscheid.

*Primary Examiner*—Milton Nelson, Jr.
*Attorney, Agent, or Firm*—Harness, Dickey & Pierce, P.L.C.

[57] ABSTRACT

A locking pivot mechanism which may be used as a seat recliner to reduce chucking of a seat back has a toothed quadrant, a toothed pawl, and an engagement member. The engagement member is biased against the pawl which, in turn, is forced into engagement with the quadrant to lock the quadrant against rotation, thus reducing chucking.

1 Claim, 2 Drawing Sheets

SEAT RECLINER FOR REDUCING CHUCKING

This is a continuation of U.S. patent application Ser. No. 08/623,465, filed Mar. 28, 1996, now U.S. Pat. No. 5,622,410.

BACKGROUND AND SUMMARY OF THE INVENTION

This invention relates generally to a locking pivot mechanism, and more particularly, to an adjustable seat recliner mechanism for reducing undesirable movement when the mechanism is locked.

Locking pivot mechanisms generally consist of a first pivoting member having a plurality of teeth which is called a quadrant, and a second toothed member, called a pawl, adapted to lockingly engage the quadrant. The mechanisms are operable to lock the quadrant and restrict its rotation, or to release the quadrant to allow it to rotate and to enable a seat back affixed to the quadrant to recline. The mechanism is selectively locked or released by manipulating the pawl, which is mounted for rotation between an engaged position where the teeth of the pawl and the quadrant mesh, and a disengaged position where the pawl retracts from and no longer meshes with the quadrant. When the quadrant and the pawl rotate, they define a first and a second center of rotation, respectively. The quadrant and pawl generally mesh at a pitch point which is not on a line between the first and second centers of rotation, so that when they are meshed, the quadrant is effectively prevented from rotating. Locking pivot mechanisms also may include a device, such as a spring, for releasably urging the pawl to rotate from the disengaged to the engaged position, so that the default position for the mechanism is a locked condition. U.S. Pat. Nos. 4,223,947; 4,314,729; 4,406,497; 4,615,551; 4,765,681; 4,770,463; 4,709,965; 4,801,177; 4,913,494; 4,591,207; 4,295,682; and RE 32,884 illustrate systems which utilize various pawl and quadrant engagement assemblies.

Another type of locking pivot mechanism includes a quadrant, a gear with two sets of teeth, a pawl, and an activating mechanism. Here, the quadrant engages one set of gear teeth and the pawl engages the other set of gear teeth. The activating mechanism is activated which, in turn, moves the pawl from an engaged position, where the pivot mechanism is locked in place, to a disengagement position, where the quadrant is free to rotate on the gear. Examples of such types of pivot mechanism are illustrated in U.S. Pat. No. 5,156,439; 5,150,632; and 5,205,609.

In reclining seats, the quadrant is mounted to an extremely long lever arm, namely the seat back, against which various forces are applied. For example, the locking recliner mechanism in a vehicle seat is quite small when compared to the length of the reclining seat back, and vehicle vibration or movement of an occupant may impose various forces upon that lever arm during use. These forces can impose a large moment about the quadrant when applied along such a lengthy lever arm, which can overcome the capability of the mechanism to anchor the quadrant and seat back. In addition, any imperfections in the components of the pivot mechanism, such as play or backlash between the engaging teeth or tolerances between the mechanism components, may allow the quadrant to move a minuscule amount even when the mechanism is locked. These small excursions are magnified by the length of the lever arm and become noticeable at the upper end of the seat. For example, the seat back of an unoccupied seat may tend to oscillate when the vehicle encounters rough road conditions. Because the motion of the seat back is amplified by the length of the seat back frame, the vibration of the seat back can be relatively large. This magnified play in a locking pivot mechanism has been termed "chucking", and refers to any imperfection or play in the mechanism components which allows movement of the quadrant and the attached seat back while the mechanism is in a locked condition.

One technique which has been employed to reduce chucking is to form the components of the pivot mechanism with exceedingly close tolerances. In other words, the corresponding teeth as well as the pivot bearings for the rotating components may be manufactured with very high precision. This technique reduces play in the mechanism, and thus reduces chucking. However, manufacturing to such close tolerances is expensive, and close tolerances may bind the components of the system and prevent smooth operation. The above disclosed patents illustrate ways to eliminate this problem. However, designers continue to strive to improve the art.

It is therefore desirable to construct a locking pivot mechanism which is relatively small and simple, which operates smoothly without binding, and does not require excessively close tolerances, yet is capable of locking the quadrant in a fixed position to inhibit play or excursions.

Accordingly, the locking pivot mechanism of the present invention provides a novel configuration to reduce chucking. The present invention provides a novel pawl quadrant and cam configuration with a biasing force applied on the cam urging the pawl into contact with the quadrant. Also, in the present invention, the quadrant pivot center, pawl pivot center and pawl and cam contact point are located at the vertices of an equilateral triangle. These features enable firm engagement of the pivot mechanism and reduce chucking.

These and other advantages and features will become apparent from the following description and claims in conjunction with the accompanying drawings.

DETAILED DESCRIPTION OF THE PREFERRED EMBODIMENTS

Figure 1:
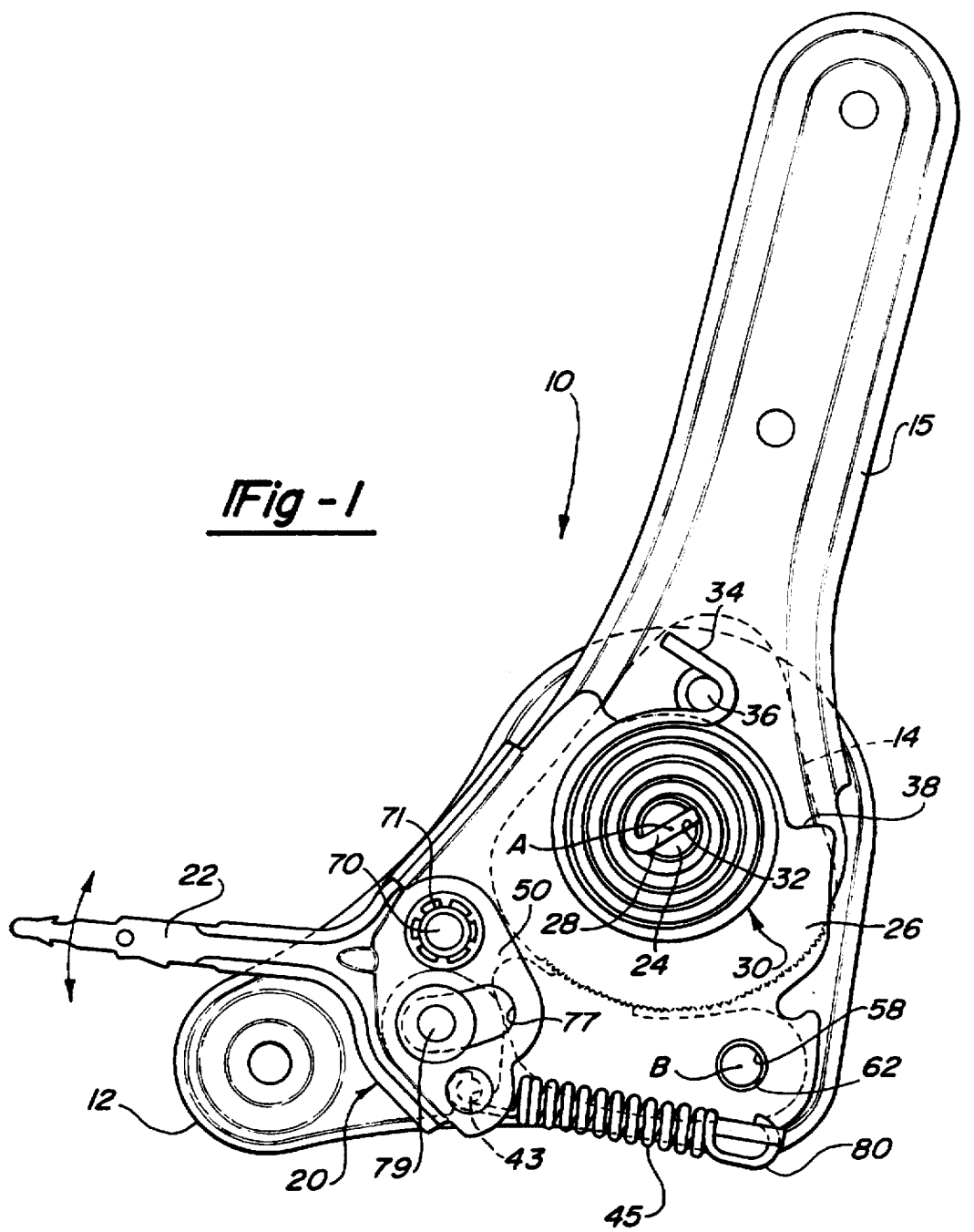
FIG. 1 is a side elevational view of a pivot mechanism arranged according to the principles of the present invention, shown in a locked configuration.
Figure 2:
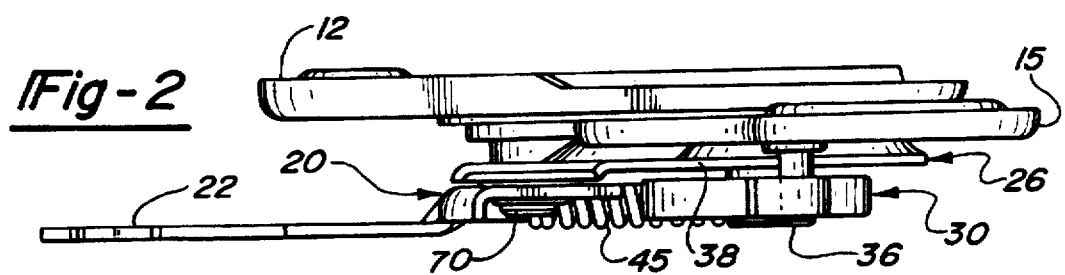
FIG. 2 is a top plan view of the pivot mechanism of FIG. 1.

The present invention generally provides a locking pivot mechanism which may be used as a seat recliner to reduce play, or chucking, of the seat back when the mechanism is locked. Referring in particular to the drawings, FIGS. 1 through 4 show a locking pivot mechanism indicated generally at 10 which includes a base plate 12 adapted to be affixed to a seat base (not shown), a quadrant 14 adapted to be affixed to a seat back (not shown), a pawl 18, and an engagement member 20 with a handle 22. Quadrant 14 is mounted for rotation about a pivot pin 24 which is rigidly affixed to the base plate 12 and a cover plate 26. An inner end 28 of a flat coil quadrant spring 30 is inserted within a slot 32 formed in the pivot pin 24, and the outer end 34 of quadrant spring 30 is wrapped around a quadrant pin 36 which is rigidly affixed to quadrant 14, such that quadrant 14 is flexibly biased in a counterclockwise direction, and the seat back (not shown) is urged in a forward direction. Quadrant pin 36 slides within an arcuate slot 38 formed as a cut-out in cover plate 26, thus restricting quadrant 14 to a limited angular range of motion.

Quadrant 14 is rotated about its center of rotation, indicated at point "A". The quadrant pin 24 passing through opening 48, in the quadrant 14, has a tight fit allowing for little, if any, play. In addition, gear teeth 42 are configured to have a pitch circle such that the teeth are numerous and small. Also, the quadrant 14 has a triangular shape which is rounded at its vertices with the teeth on the arcuate base 50 of the triangle. Also, a mounting bracket 15 is attached to the quadrant 14 to attach the quadrant to a seat back.

A locking pawl 18 has a pawl pin 58 with ends which are mounted for rotation within a cover plate opening 62 and a base plate opening. The pawl 18 is mounted for rotation about the pawl pivot pin center of rotation, indicated at point "B", between an engaged position shown in FIG. 3, in which a plurality of pawl teeth 66 mesh with quadrant teeth 42, and a disengaged position shown in FIG. 4, where pawl teeth 66 retract from quadrant teeth 42 and enable pawl 18, and thus quadrant 14, to freely rotate. Because quadrant teeth 42 and pawl teeth 66 are relatively small, pawl 18 is capable of making fine adjustments in the locked position. Pawl 18 further has a thrust cam surface 68 which is adapted to be engaged by a cam surface 21 of a cam 40 of the engagement member 20.

Figure 4:
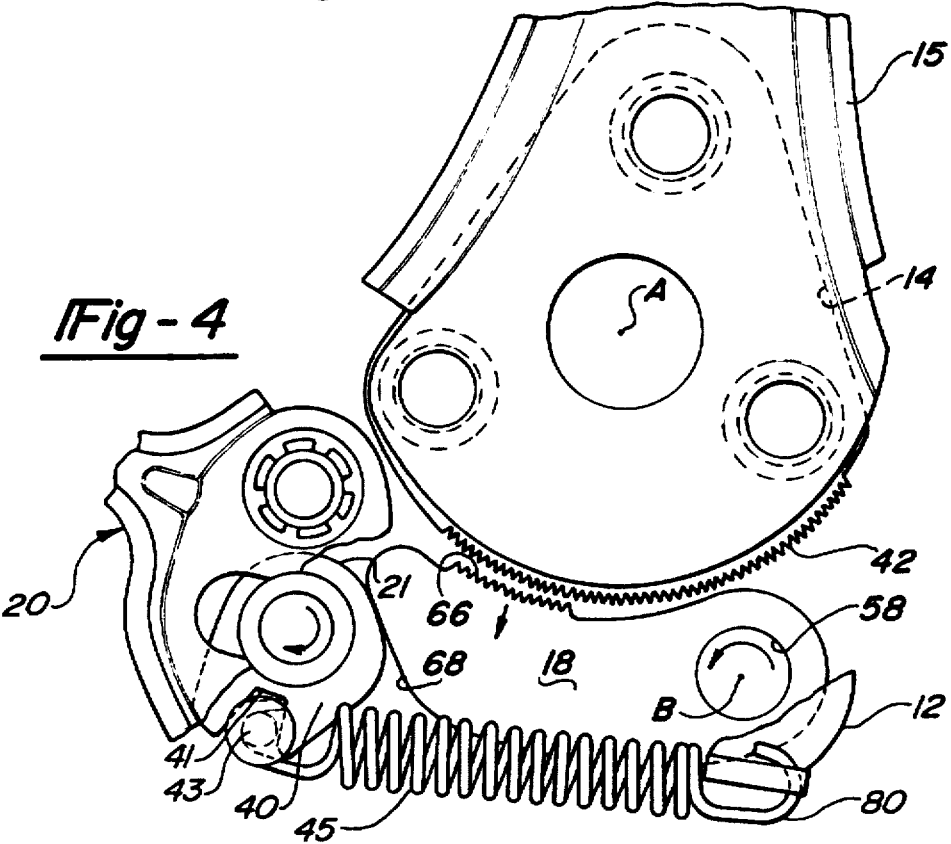
FIG. 4 is a view like FIG. 3 in a disengaged position.

Engagement member 20 includes the handle 22, coupling portion 50, and the cam 40. The coupling portion 50 includes an aperture 71 which enables a pin 70 to rigidly affix the coupling portion to the base 12 and cover 26. The engagement member 20 is pivotally mounted to the base plate 12 and cover plate 26 to rotate in a counterclockwise engaging direction or a clockwise disengaging direction. Also, the coupling portion includes a slot 77 which limits the movement of the engagement member. A pin 79, which passes through cam 40, is in slot 77 to limit movement of the engagement member 20. Cam 40 rotates about pin 79. Also, cam 40 has a cut out 41 which receives pin 43. Pin 43 is secured with the coupling portion 50 and a spring 45 to provide a biasing force for engagement member 20. When engagement member 20 rotates in the counterclockwise engaging direction, cam 40 is rotated, via pin 43 and spring 45, such that cam surface 21 pushes on thrust surface 68 of pawl 18 at a contact point "C", to urge pawl teeth 66 to mesh with quadrant teeth 42 and to thereby inhibit rotation of quadrant 14. In this position, points A, B and C are located substantially at the vertices of an equilateral triangle. When engagement member 20 rotates in the disengaging clockwise direction, cam 40 rotates such that cam surface 21 relieves thrust on cam surface 68 and allows pawl 18 to rotate in a counterclockwise disengaging direction, such that pawl teeth 66 disengage from quadrant teeth 42 and allow quadrant 14 to freely rotate as seen in FIG. 4. The outer end 80 of spring 45 is rigidly affixed to base plate 12 or cover plate 26, or both. Spring 45 flexibly biases engagement member 20, and in turn cam 40, in the counterclockwise engaging direction, such that cam surface 21 engages thrust surface 68 of pawl 18 and urges pawl teeth 66 to mesh with quadrant teeth 42 and restrict rotation of quadrant 14. The pivot mechanism of the present invention may of course utilize any appropriate type of biasing device rather than coiled springs 30 and helical compression spring 45, including leaf springs, helical springs, or hydrodynamic biasing devices.

Figure 3:
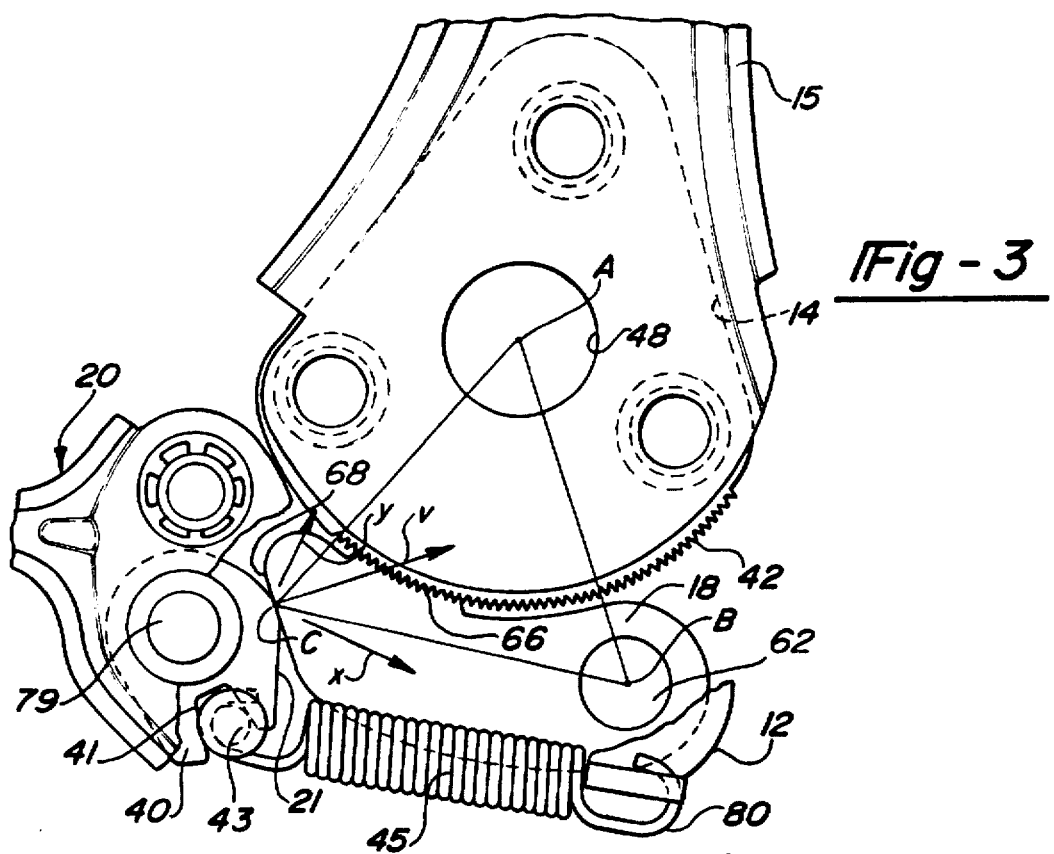
FIG. 3 is a side elevational view of the pivot mechanism of FIG. 1, with the base plates and spring removed.

In operation, the default position of the mechanism is shown in FIGS. 1 and 3, in which spring 45 urges engagement member 20 and cam 40 in an engaging direction, pushing on thrust or cam surface 68 to urge pawl 18 to also rotate in an engaging direction, thus causing pawl teeth 66 to firmly engage quadrant teeth 42 and prevent rotation of the quadrant 14. Engagement member 20 and, in turn, cam 40 under the biasing force, automatically accounts for certain dimensional tolerances by urging pawl 18 to mesh firmly with quadrant 14, regardless of those tolerances, thus reducing any backlash defined between pawl teeth 66 and quadrant teeth 42 and thus inhibits movement of quadrant 14, and also the seat back (not shown). On the other hand, an operator may pull handle 22 upward, causing the coupling portion and cam 40 to rotate in the disengaging clockwise direction and alleviate the locking force imposed on thrust or cam surface 68. The rotation of engagement member 20 and cam 40 in the disengaging direction is limited by slot 77, which prevents excessive rotation of engagement member 20 and prevents cam 40 from excessively retracting. Pawl 18 is then allowed to fall by the influence of gravity to the disengaged or released position shown in FIG. 4, such that pawl teeth 66 no longer mesh with quadrant teeth 42. Quadrant 14 with the seat back (not shown) may rotate, and the seat back (not shown) may be reclined or inclined to a desired position. The rotation of quadrant 14 is of course biased in a forward counterclockwise direction by quadrant spring 30, and its angular range of motion is limited by quadrant pin 36 and arcuate slot 38. After the position of the seat back (not shown) and quadrant 14 is adjusted, the operator may release handle 22, to enable spring 45 to rotate the engagement member and cam 40 in the engaging direction to again lock the angular position of the pawl 18 and quadrant 14 with the seat back (not shown).

According to the novel configuration of the present invention, spring 45 is adapted to selectively push, via cam 40, on pawl 18 to urge it toward quadrant 14, thus reducing the distance between the quadrant center of rotation at point "A", pawl center of rotation at point "B" and a pitch arc defined by pawl teeth 66, causing pawl teeth 66 and quadrant teeth 42 to more firmly mesh. In particular, as best shown in FIG. 3, due to the configuration of thrust surface 68 of pawl 18, the force exerted by engagement member 20 against pawl 18 can be represented by a vector "V" that is directed intermediate the pivot points A and B. This force vector "V" is made up of its component vectors "X" and "Y" as shown. As will readily be appreciated by those skilled in the art, component force vector "X" is directed substantially at pivot point "B". Accordingly, chucking of the seatback which is connected to the quadrant 14 is substantially reduced. In addition, the "Y" component force vector is directed substantially perpendicular to the interface between the locking pawl 18 and the quadrant 15, thereby ensuring that the pawl teeth 66 firmly mesh with the quadrant teeth 42 which increases the load carrying capacity of the pivot mechanism 10.

The present invention therefore provides a locking pivot mechanism which is relatively small and simple, yet is capable of locking the quadrant in a stationary position to restrict chucking of the quadrant when the mechanism is locked.

It should be understood that the preferred embodiments of the invention have been shown and described herein, and that various modifications of the preferred embodiment of the present invention will become apparent to those skilled in the art after a study of the specification, drawings and the following claims.

What is claimed is:

1. A pivot mechanism for a vehicle seat, comprising:

a quadrant adapted to be coupled with a seat back, said quadrant being pivotally mounted about a first pivot and having a set of teeth;

a locking pawl having a first cam surface and a set of teeth engaging said quadrant teeth for releasably locking said quadrant in position, said locking pawl being pivotally mounted about a second pivot and moving from a first pawl position engaging said quadrant to a second pawl position disengaging said quadrant enabling movement of said quadrant;

a cam member pivotally mounted on a third pivot and having a second cam surface for engaging said first cam surface of said locking pawl when said cam member is in a first cam position, said cam member being biased in said first cam position so as to exert a locking force on said locking pawl when said locking pawl is in said first pawl position and movable to a second cam position enabling rotation of said locking pawl to said second pawl position, such that when said cam member is in said first cam position the locking force exerted against said locking pawl creates a force vector that is directed between said first and second pivots so as to substantially bisect a line extending between said first and second pivots to thereby reduce the chucking of the seat back and ensure that the locking pawl teeth and quadrant teeth firmly mesh.

* * * * *